(12) United States Patent
Cetin et al.

(10) Patent No.: US 7,595,674 B1
(45) Date of Patent: Sep. 29, 2009

(54) UNIVERSAL SERIAL BUS (USB) DRIVER CIRCUIT, SYSTEM, AND METHOD

(75) Inventors: Joseph A. Cetin, San Diego, CA (US); Jason F. Muriby, San Diego, CA (US); Matthew D. Sienko, La Jolla, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 15 days.

(21) Appl. No.: 11/380,127

(22) Filed: Apr. 25, 2006

Related U.S. Application Data

(60) Provisional application No. 60/679,115, filed on May 9, 2005.

(51) Int. Cl.
*H03K 5/12* (2006.01)

(52) U.S. Cl. .......................... 327/170; 327/108; 326/82

(58) Field of Classification Search ......... 327/108–112, 327/170, 291, 298, 126, 172; 326/82–87
See application file for complete search history.

(56) References Cited

U.S. PATENT DOCUMENTS 5,864,253 A * 1/1999 Katakura et al. ............ 327/297

6,037,812 A * 3/2000 Gaudet ........................ 327/116

* cited by examiner

*Primary Examiner*—Lincoln Donovan
*Assistant Examiner*—Diana J Cheng

(57) ABSTRACT

A driver circuit, system, and method is provided. The driver circuit includes a plurality of delay cells or circuits, each comprising a set of flip-flop circuits coupled in series to produce a staged set of outputs onto an output port of the driver circuit. The staged outputs are sequentially applied to the output port at a time depending on the number of flip-flop circuits within each stage. The number of such circuits can be programmably modified so that the slew rate output of the driver circuit can be programmably changed. The driver circuit can be a low speed driver circuit clocked by a low speed clocking signal of, for example, 1.5 MHz, with the slew rate derived by a clocking signal of, for example, 480 MHz. The higher speed clocking signal clocks the flip-flop circuits, yet the output is staged so that the low speed driver circuit transitions between logic states using the higher speed clock, but at a must slower edge rate. Therefore, the driver circuit, system, and method avoids passive electrical components and the PVT fluctuations associated therewith.

18 Claims, 4 Drawing Sheets

UNIVERSAL SERIAL BUS (USB) DRIVER CIRCUIT, SYSTEM, AND METHOD

PRIORITY CLAIM

This application claims priority to U.S. Provisional Application No. 60/679,115 entitled "Novel USB Low-Speed Driver Using a USB 2.0 Clock Element," filed May 9, 2005.

BACKGROUND OF THE INVENTION

1. Field of the Invention

The present invention relates to data communication and, more particularly, to data communication over a universal serial bus (USB) using a driver circuit, system and method that utilizes a higher speed clock to derive a lower speed data transfer across, for example, the USB at a controlled data transition rate, or slew.

2. Description of the Related Art

The following descriptions and examples are given as background only.

The universal serial bus (USB) is implemented within a standardized protocol as an easy-to-use interface for a personal computer. Since then, USBs have gained widespread acceptance. From the user perspective, the benefits of USB include universal plug-and-play and relative ease of use. When a USB peripheral device is plugged into a USB port on a computer or host, the system will auto-detect and auto-configure the peripheral device. In most cases, there is almost no user intervention required.

The USB host and peripheral devices allow numerous types of data communication to various devices that include peripheral devices such as printers, scanners, keyboards, mouse, joysticks, digital cameras, digital video recorders, data acquisition devices, modems, speakers, telephones, storage devices such as Zip drives or any other peripheral or computing device. Within both the host and the peripheral device, a transceiver is required for receiving and transmitting USB-compatible signals across the USB.

The original USB specification was described as version 1.1 or, more specifically, as the Universal Serial Bus Revision 1.1 Specification. The original specification was modified later to accommodate higher speed signals across the USB, and version 2.0 was derived. Both the USB 1.1 and 2.0 interfaces and specifications are available at the USB website, www.usb.org. USB 1.1 focused on making computing easy and was successful in achieving that goal. However, the bandwidth of USB 1.1 proved insufficient for some applications. For example, USB 1.1 provided transmission at a top speed of 12 Mb/s and at some applications proved overly sluggish. Resulting from this problem, USB 2.0 was developed. USB 2.0 can transfer data at 480 Mb/s. However, USB 2.0 protocol requires backward compatibility to the USB 1.1 devices (host and peripheral devices). Thus, USB 2.0 requires transceivers which can send and receive data at 480 Mb/s and also at the USB 1.1 rate of 12 Mb/s full speed and 1.5 Mb/s low speed.

The USB drivers that form part of the USB transceiver for a low speed transmission typically use large resistors and capacitors to implement slew rate control, alternatively known as "edge-rate" control, of the data sent from the driver onto the USB. For example, the USB 2.0 and 1.1 specifications call for a well-defined time at which the data output from the driver onto the USB transitions from a low to a high voltage value or vice-versa. That time of transition is basically demonstrated as an angle or transition rate from logic values 1 to 0 or vice-versa. In driver nomenclature, the rate at which a signal changes from a low to a high voltage value or vice-versa is oftentimes referred to as the slew rate. It is important that when producing an output from a driver, the slew rate is carefully controlled within a defined window, and that window is typically specified by the USB specification.

Using large resistors and capacitors to control the slew rate involves analog methodologies and consumes considerable amount of silicon surface area in order to accommodate the resistors and capacitors. For example, the resistors are often fairly long polysilicon elements and the capacitors can be parallel-plate capacitors, both of which consume integrated circuit area. Moreover, due to process fluctuations, the capacitor plate size, dielectric constant, and thickness can vary from wafer-to-wafer or wafer lot-to-wafer lot. Still further, capacitors and resistors oftentimes perform differently at different temperatures. Therefore, the analog methodology can lead to highly uncontrollable slew rates at the output of the USB driver. Attempts to more tightly control the driver performance may require significantly long design verification time, capacitor trimming, and other means that would deleteriously increase the design cycle time. As the semiconductor fabrication process changes or as the process technology of one vendor differs from another, it is difficult to port the analog design methodology between technologies or vendors. Therefore, the slew rate can vary dramatically among technologies, vendors, and across voltage and temperature fluctuations.

It would be desirable to introduce a driver circuit that is not susceptible to technology, vendor fluctuations, or fluctuations in operating voltage and/or temperature. The desired driver circuit and driving methodology should avoid the conventional analog techniques and the lack of slew rate control offered by such techniques.

SUMMARY OF THE INVENTION

The following description of various embodiments of circuits and methods is not to be construed in any way as limiting the subject matter of the appended claims.

The problems outlined above are in large part solved by an improved driver circuit. Preferably, the driver circuit is that which is used to drive signals onto a USB-type conductor or pair of conductors. The driver circuit can be within a transceiver placed within a port at or near a terminal end of the USB conductor or conductors. Preferably, the driver circuit can be used to drive data onto the USB conductor or conductors at a rate of, for example, 1.5 Mb/s.

The improved driver circuit avoids analog-type drive techniques, such as those used in capacitive resistors and capacitors. Instead, the driver circuit uses clock elements. The clock elements are preferably latches or flip-flop circuits. More preferably, the flip-flop circuits are D-type flip-flops that transfer the incoming signal onto the output during a transition of a clocking signal. The clocking signal placed onto the flip-flops is preferably the high speed clocking signal defined in the USB specification, and which transitions at a rate of 480 MHz. The high speed clocking signal is present, and used to transfer high speed data across the USB according to the USB specification, revision 2.0. The flip-flop circuits are coupled in series, whereby the output of the first flip-flop circuit is applied to the input of the second flip-flop circuit, and so forth to form a series-connected set of flip-flop circuits. A set of flip-flop circuits are associated with each stage of the driver circuit, whereby there may be multiple stages which perform the appropriate delay from the incoming data to the outgoing data. The outgoing data is preferably a differential pair of signals, and associated with the delay circuit within each stage is a differential line driver circuit.

According to one embodiment, the slew rate output from the driver circuit is adjustable depending on the number of flip-flops within the series-connected set of flip-flop circuits. As the number of flip-flop circuits within each stage increases, the amount of delay at the output of that stage will also increase. Since the stages are coupled in series, the output of each stage transitions sequentially relative to the preceding and succeeding stages. The sequential activation of each stage is then placed on a differential pair of conductors to cause the output from the overall driver circuit to transition from a logic low voltage value to a logic high voltage value or vice versa. As noted herein, a logic low voltage value is a voltage approximately near 0.0 volts or ground, and a logic high voltage value is a voltage at or near the power supply voltage. Preferably, the power supply voltage is at or near 3.3 volts. Accordingly, the logic high voltage value can be at least 90% of 3.3 volts.

Broadly speaking, the present invention contemplates a driver circuit, system, and method. The driver circuit can include a plurality of delay circuits, each of which comprise a set of flip-flop circuits coupled in series to produce a single output from each set when the last of a corresponding set of clocking signal transitions occur. The single output from each of the set of flip-flop circuits is then sequentially applied to an output port of the driver circuit. The output of each of the set of flip-flop circuits is sequentially applied to form an output slew rate from the driver circuit that is proportional to a quantity of the set of flip-flop circuits within each delay circuit. Thus, as the quantity of the set of flip-flop circuits within each delay circuit increases, the slope showing the transition from a logic low to a logic high voltage value will decrease or vice-versa for a logic high to a logic low voltage value. A decreasing slope indicates a decreasing slew rate. Conversely, if the set of flip-flop circuits is decreased, the slope will increase and the overall slew rate will increase both for a rising or falling edge.

Accordingly, the driver circuit comprises a plurality of delay circuits coupled to receive incoming data and produce a data control delay signal from the output of each of the delay circuits after a corresponding set of clocking signal transitions have occurred. The driver circuit includes an output port coupled to combine each of the data control delay signals upon a conductor to form a driver circuit output signal having a slew rate proportional to the number of said set of clocking signal transitions.

A method is also contemplated for controlling a slew rate output from a driver circuit. The method includes producing an outgoing signal delayed from an incoming signal at the output of each stage within a plurality of stages. The outgoing signal from each stage is then combined upon a conductor. A delay of the outgoing signal can be varied relative to the incoming signal for each stage to cause a corresponding varying of the slew rate output from the driver circuit.

BRIEF DESCRIPTION OF THE DRAWINGS

Other objects and advantages of the invention will become apparent upon reading the following detailed description and upon reference to the accompanying drawings in which.

Figure 1:
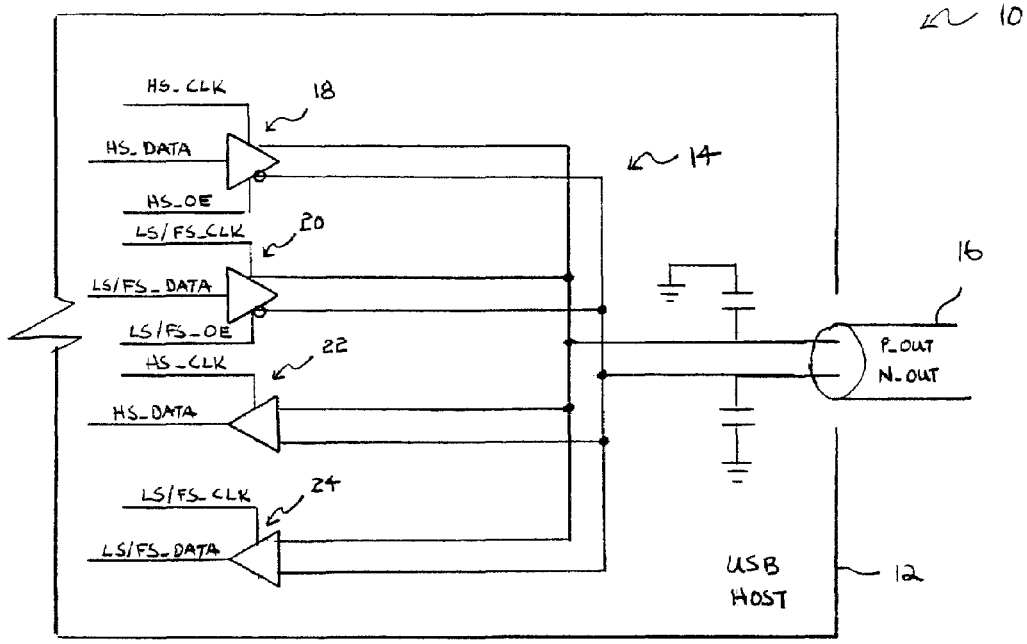
FIG. 1 is a circuit schematic of a transceiver within a host for sending and receiving differential signals into and from a USB cable.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the drawings, FIG. 1 illustrates at least part of a USB system 10. System 10 includes a host 12 and a transceiver 14 within host 12. Host 12 is designed to send and receive data across a USB conductor or pair of conductors 16 to and from, respectively, a peripheral device. Transceiver 14 includes a transmitter which sends and receives USB-compatible signals. So as to be backward compatible to version 1.1 protocol and to maintain compatibility with version 2.0 protocol, transceiver 14 includes a high speed transmitter 18, a low speed/full speed transmitter 20, a high speed receiver 22, and a low speed/full speed receiver 24.

High speed transmitter 18 transmits data at the clock edges of a high speed clock (HS_CLK). The high speed clock preferably operates according to the USB specification at 480 MHz. Therefore, the high speed clock is available within transceiver 14. In addition to transmitter 18, a low speed/full speed transmitter 20 can transmit data either at a full speed of 12 Mb/s or 1.5 Mb/s depending on whether the output is enabled for low speed or full speed. If low speed is used, then a 1.5 MHz clock is used; if a full speed is enabled, then a 12 MHz clock is used. As shown, the transmitters are enabled whenever HS_OE and LS/FS_OE are active. Within transceiver 14 are receivers 22 and 24, which receive the high speed data and the low speed/full speed data at the high speed clock rate of 480 MHz or the low speed/full speed clock rate of 1.5 MHz or 12 MHz, respectively.

Figure 2:
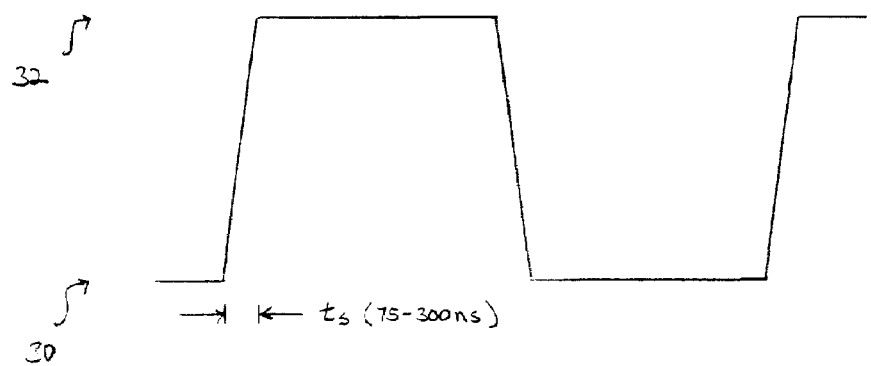
FIG. 2 is a timing diagram of edge rate or slew rate for data transferred into the USB cable.

The transmitter portion of transceiver 14 and, more specifically, the driver circuits 18 and 20 are defined in the USB specification as requiring a certain slew rate and data transfer rate. The slew rate takes into account the load impedance of the USB conductor 16. According to the specification and shown in FIG. 2, the slew rate from a logic low voltage value 30 to a logic high voltage value 32 must be within a certain window $t_s$. The slew rate or $t_s$ for the low speed driver 20 which produces data upon the USB conductor 16 at 1.5 Mb/s is defined in the USB specification to be between 75-300 ns. The same slew rate would occur when transitions occur from a logic high voltage value to a logic low voltage value. Thus, in order to meet the USB specification, the low speed driver must produce data which transitions between logic states within the 75-300 ns range.

Figure 3:
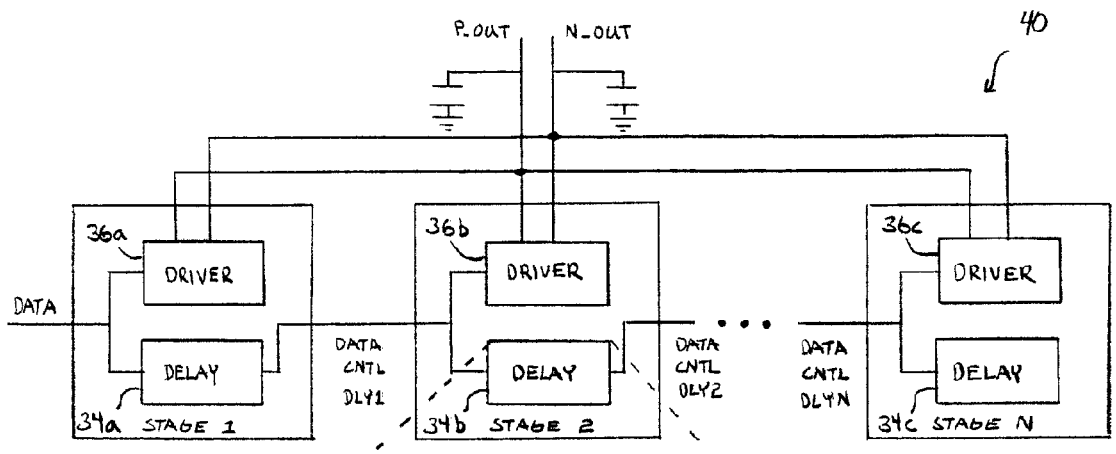
FIG. 3 is a circuit schematic of a USB driver circuit.

Referring to FIG. 3, one mechanism in which to produce the desired slew rate is to use staged turn on of a differential line driver. The staged turn on is effectuated through delay circuits in each stage 34a, 34b, and 34c. As shown, there may be N number of stages and N number of delay circuits. As the incoming data is placed into the first stage delay circuit 34*a*, the outgoing signal from the first stage does not occur until some delay thereafter. Associated with each stage is also a differential line driver 36*a*, 36*b*, and 36*c*. Like the delay circuits, a driver circuit is associated with each stage and there may be N number of stages. The first driver circuit 36*a* within the succession places the incoming data in differential form onto the output port of driver circuit 40 without any delay associated therewith. However, after delay is incurred within the first stage by delay circuit 34*a*, the second driver 36*b* will not produce its differential output onto the output port of driver circuit 40 until some time thereafter. This succession of placing differential signals upon the output port delayed in time from the preceding signal produces an accumulation of voltages or an accumulated reduction of voltages to produce a corresponding rising edge or falling edge at the driver circuit 40 output (i.e., upon the differential output P_OUT and N_OUT).

Figure 4:
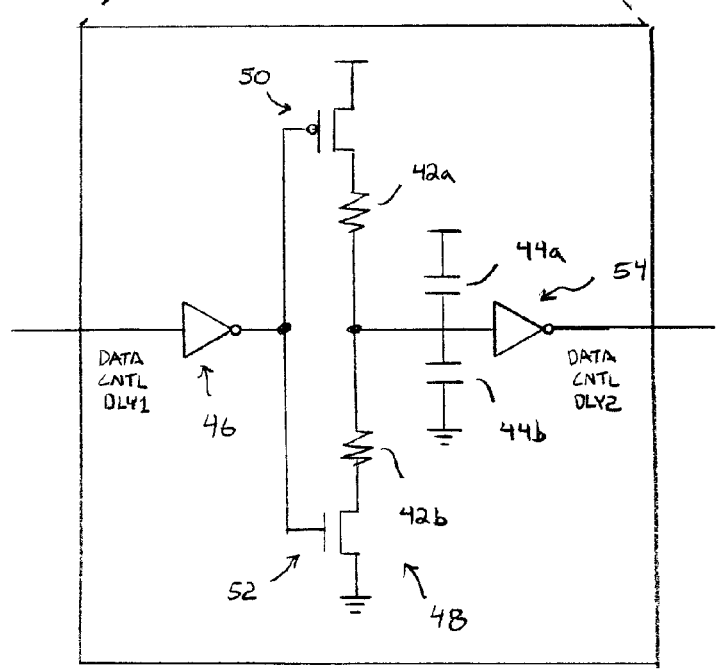
FIG. 4 a detailed circuit schematic of a delay circuit within each stage of the driver circuit shown in FIG. 3.

A detail of one delay circuit 34 is shown in FIG. 4 utilizing passive resistors 42*a*/42*b* and capacitors 44*a*/44*b* to effectuate changes in delay. At the output of a first inverter 46 is a second inverter 48 having a pair of PMOS and NMOS transistors 50 and 52, respectively, with mutually-coupled gate conductors. The drain terminals of transistors 50 and 52 are coupled to resistors 42*a* and 42*b*, and resistors 42*a* and 42*b* are coupled to make capacitive load of capacitors 44*a* and 44*b*. Capacitors 44*a* and 44*b* are coupled to the resistive output of inverter 48 and to respective power supply and ground supply conductors. Depending on the size of the resistive and capacitive elements, the amount of delay at the output of inverter 48 can vary. If the resistive and capacitive elements increase, then the RC delay will increase, for example. The delayed output is then fed into possibly another inverter 54.

The delay within circuit 34 is shown to vary depending on changes to the resistive and capacitive components. The greater the delay, the greater will be the time span between the incoming signal and the outgoing signal within each stage. The will cause a lessening in the turn on or turn off slope or slew rate. However, if the delay is decreased, the slew rate will increase. Unfortunately, the passive, resistive, and capacitive components have values which can drastically fluctuate over process, voltage, and temperature changes. Attempts to design a consistent and reliable delay cell using capacitors and resistors as shown can be difficult in many instances. Therefore, the embodiments shown in FIGS. 5 and 6 are preferred over that shown in FIGS. 3 and 4.

Figure 5:
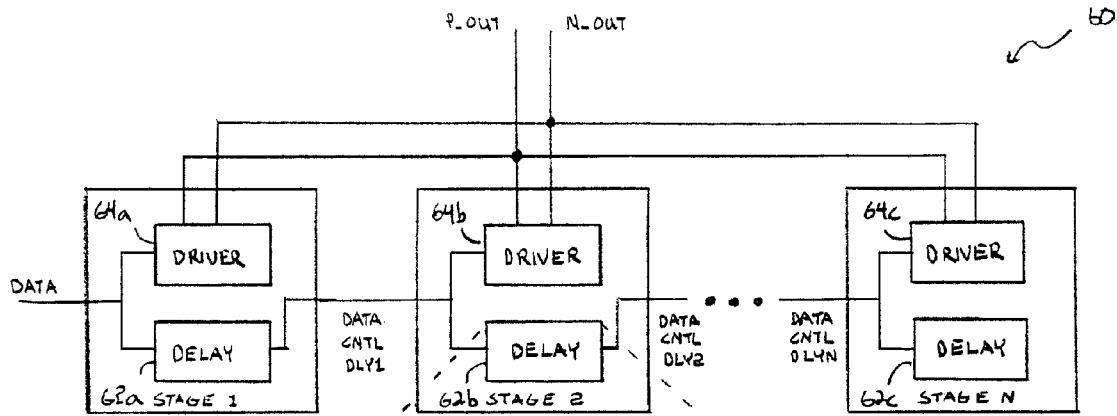
FIG. 5 is a circuit schematic of a USB driver circuit, according to a preferred embodiment.

Turning now to FIG. 5, an improved driver circuit 60 is shown. Instead of using capacitors and resistors, clock elements are used to provide a more consistent, controllable, and reliable edge rate or slew rate from the output of circuit 60. Circuit 60 includes multiple stages that can vary from a single stage to N number of stages, where N can be selected as almost any number. Obviously, the larger the number of stages, the more delay from the output of the first stage to the output of the Nth stage. Each stage includes a delay cell 62*a*, 62*b*, and 62*c*. Moreover, each stage includes a differential line driver 64*a*, 64*b*, and 64*c*. Driver 64 may be a pair of transistors, such as PMOS and NMOS transistors coupled together as an inverter which can be also coupled as an inverter-follower, with the inverters coupled as a operational amplifier.

The inverter-follower architecture takes a single-ended input as the output from each stage. In the case of the first driver 64*a*, the incoming data signal is converted and then input into differential or complementary outputs with respect to a common voltage value. An inverter-following line driver can easily be accomplished with a dual operational amplifier configuration. Alternatively, the operational amplifiers can be cross-coupled in order to better balance the output since both positive and negative feedback paths from each operational amplifier is cross-coupled to the opposing operational amplifier. For example, a cross-coupled Howland circuit can suffice.

Figure 6:
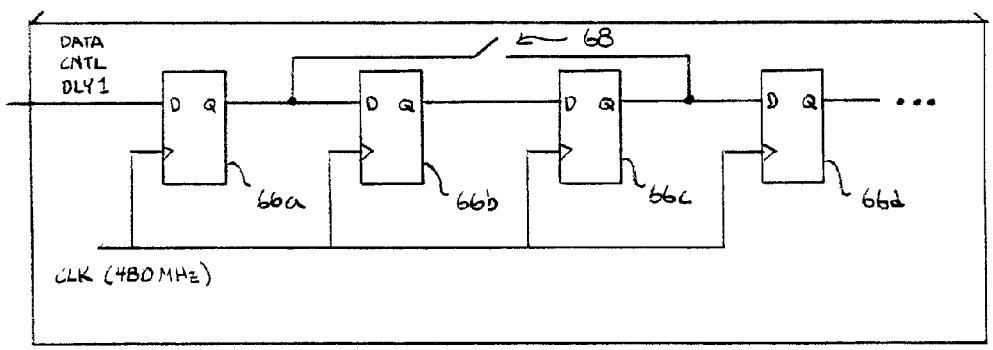
FIG. 6 is a detailed circuit schematic of a delay circuit within each stage of the driver circuit shown in FIG. 5.

Within each delay cell is a set of flip-flop circuits 66*a*, 66*b*, 66*c*, and 66*d*, preferably a set of D-type flip-flop circuits, shown in FIG. 6. The set of flip-flop circuits can range in number from one to M, where M can be almost any number. For sake of brevity, only four flip-flop circuits are shown; however, it is understood that only a single flip-flop circuit or more than four flip-flop circuits can be utilized. The number of flip-flop circuits can be programmably instituted by using a switch 68, for example. Switch 68 can be responsive to a user-programmed signal to connect the switch or disconnect the switch. If connected, a bypass can occur from the output of one flip-flop circuit to the input of another flip-flop circuit downstream within the chain or series-coupled set of flip-flop circuits. Thus, as shown, instead of four flip-flop circuits, only two flip-flop circuits can be series-coupled if switch 68 is activated.

The number of flip-flop circuits 66 will determine the amount of delay within each stage and, thus, determine the time difference between the output of the preceding stage and the output of the succeeding stage. If that time difference is enhanced, it will reduce the slope or "edge" of the driver circuit 60 (FIG. 5) output. A reduced slope or slew rate can be adapted to meet a particular specification, for example, the USB specification for a low speed driver output. However, to meet that slew rate, a clocking signal is needed to feed the clocking inputs of each of the flip-flop circuits 66. It is desired that the clocking signal be taken from the same clocking signal used to transition data across the USB.

The clocking signal may preferably be the high speed clocking signal used to transmit data at 480 Mb/s. The 480 Mb/s output requires a 480 MHz clocking signal present on the high speed driver circuit. Using that signal, the conductor which feeds the high speed driver output for the USB 2.0 specification can be further routed to the low speed driver output specified in the USB protocol. Thus, the clocking signal used to feed flip-flop circuits 66 can be 480 MHz as shown. That clocking signal is present, however, because the USB 2.0 protocol maintains backwards compatibility to the full speed (12 Mb/s) and low speed (1.5 Mb/s) devices defined in the USB 1.1 specification.

FIG. 6 illustrates that in the intra-stage data and enable signals, a delay from stage-to-stage takes place using flip-flop circuits clocked using the USB 2.0 specified 480 MHz clock. The delay from stage-to-stage will be an exact multiple, depending on the number of flip-flop circuits used, of the 2.08333 ns USB 2.0 clock. Thus, if there are eight flip-flop circuits 66 within each stage, then the delay within each stage is 8*2.08333 ns=16.64 ns. There may also be eight driver stages, resulting in seven actual delay steps at the output before all eight stages are active.

The output edge rate is largely determined by the stage-to-stage delay. However, the sizing of the transistors for the differential line drivers that are used to drive the output will also contribute somewhat to the final edge rate. By controlling the delay between driver stages, however, the majority contributor to the edge rate of the output signal is highly controlled across processing temperature variations. Using the above example, the intra-stage delay accounts for 8*2.08333 ns*7=117 ns. The differential line drivers contribute approximately an additional 28 ns edge rate via simulation results. Thus, the output edge rate of approximately 145 ns is mostly due to the 117 ns associated with the flip-flop circuits delay, not the 28 ns associated with the differential line drivers. Thus, approximately 80% of the output edge rate is highly controlled by the clock delay cell, leading only 20% of the edge rate to vary across process and temperature due to skewing of the differential line driver transistors, and the parasitic resistors and capacitors associated therewith. Given that the USB 2.0 low speed driver edge rate specification ranges from 75-300 ns, realization of an 80% control over the edge rate due to the more highly precise delay cell that uses flip-flop circuits, largely simplifies the overall design and leaves it less susceptible to PVT fluctuations.

Although this specific embodiment realizes the use of a USB 2.0 480 MHz clock, other USB 2.0 implementation clocks (or clocks other than those defined in the USB specification) may be used with varying number of flip-flop circuits or delay stage combinations to achieve a desired edge rate between 75-300 ns at the output. For example, in the embodiment described above, the same 480 MHz clock could be implemented with seven flip-flop circuits per stage (instead of eight) while still achieving a highly controlled edge rate within the 75-300 ns low speed driver edge rate specification. This is shown by 7*2.08333 ns*7=102.08 ns. The number of input signals to each stage, the implementation of the transistor control logic, and the size and configuration of the transistors which drive the differential line output can also vary from implementation-to-implementation while still maintaining the desired result of a highly controlled edge rate.

Figure 7:
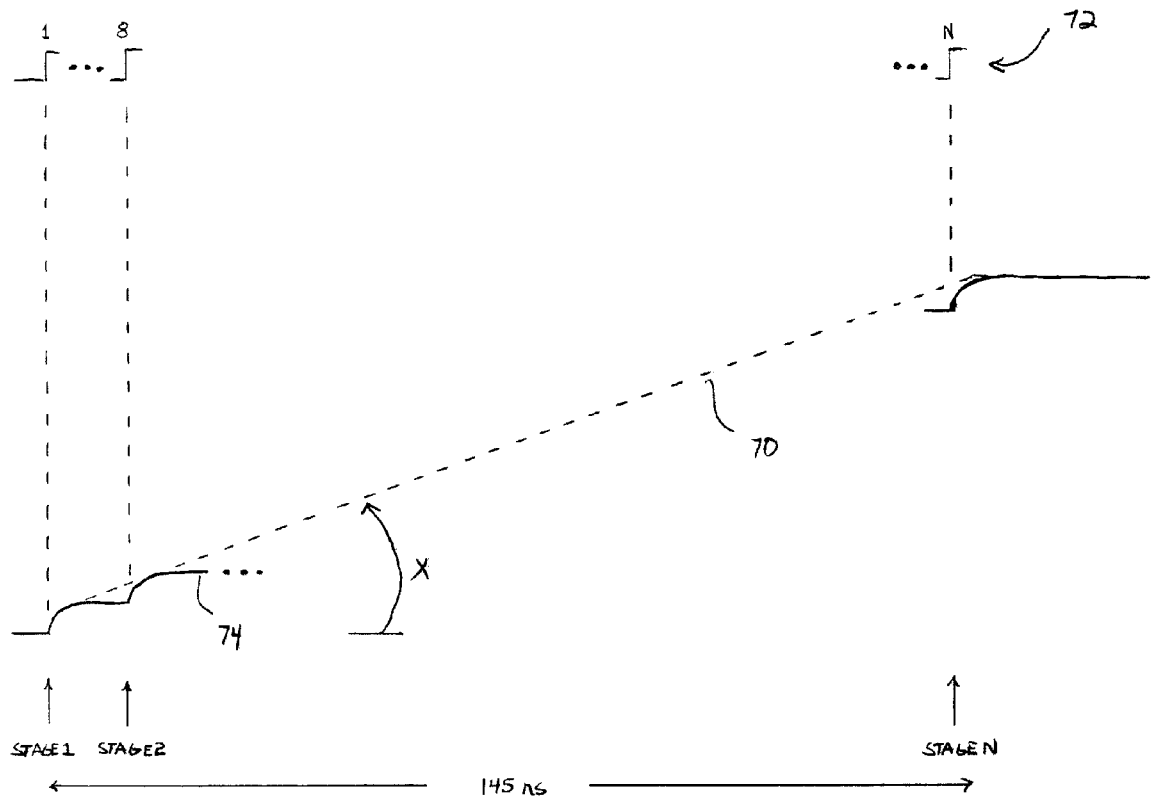
FIG. 7 is a timing diagram of a signal transition resulting from sequential activation of the driver stages of FIG. 5.
Figure 8:
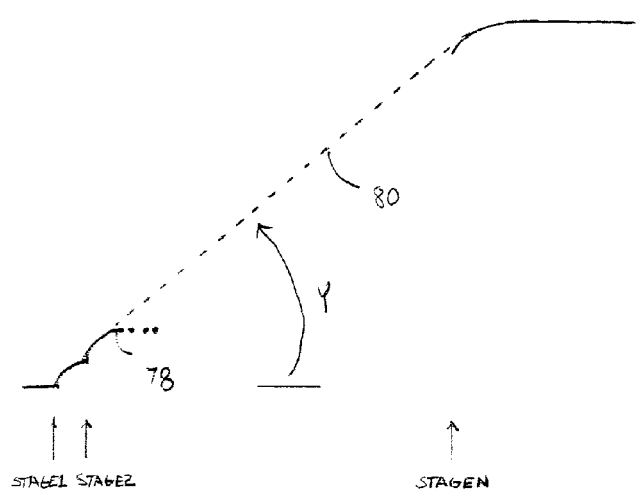
FIG. 8 is a timing diagram of a signal transition resulting from sequential activation of a lesser number of flip flops within each stage of the driver stages shown in FIG. 6.

FIGS. 7 and 8 illustrate a timing diagram whereby an example is forwarded of having eight flip-flop circuits within each stage. Therefore, eight clock transitions are needed within each stage. The first stage output will occur immediately without any delay at the first clock edge. The second stage will occur on the eighth clock edge, and so forth in multiples of eight clock edges for the outputs from each stage. As the number of clock edges increase for each stage, the overall slope X will decrease. The clocking signals that can transition at 480 MHz are shown as reference 72 and the outputs of each stage are shown as reference 74. Slope 70 indicates the transition of the overall driver circuit output for driver circuit 60, where the stages are merged onto the differential signals placed on the pair of output conductors P_OUT and N_OUT. If the number of clocking signal transitions decrease for each stage, the angle X will increase—increasing the slew rate or edge rate of the output signal. This is shown in FIG. 8 where, for example, four transitions are needed rather than eight within each stage, thereby compressing the time outputs of each stage and increasing the angle from X (FIG. 7) to Y. The clocking signals are shown by reference 76 and the staged outputs are shown by reference 78. The overall, multi-staged output is shown along slope 80.

The embodiment shown uses a digital technique for setting the edge rate or slew rate which is highly predictable and easy to port other technologies. The improved solution is a digital technique as it does not require specifically sized passive or active elements to set the delay. Rather, the improved solution uses a clock signal with known period which drives digital logic to set the delay. The improved solution realizes availability of clock signals in the USB 2.0 application to precisely determine the time at which the digital logic will drive the NMOS and PMOS driver transistors. The improved USB low speed driver hereof significantly reduces low speed driver layout area used to implement edge-rate control by realizing the use of a USB 2.0 480 MHz clock instead of large resistors and capacitors. One embodiment of the improved driver results in an approximate 60% savings in total low speed driver area. The R&C values required to sufficiently delay the intra-stage signals are large and are usually derived using large polysilicon resistors, transistors, or metal. Minimizing the area for any given circuit implementation is always an important design goal with the obvious result that less area directly equates to less production cost.

The improved driver circuit hereof also provides very accurate low speed driver edge rates across temperature and process variations. Since the edge rate varies little across silicon process variations, significantly less design time is spent sizing analog elements and less simulation time is spent simulating every process and temperature combination. Additionally, the likelihood of a design meeting target specifications the first time is improved, thus, reducing the mask ratio which saves money and further development time.

Embodiments of the present inventions are well-suited for performing various other steps or variations of the steps recited herein, and in a sequence other than that depicted and/or described herein. In one embodiment, such processes carried out by processors and other electrical and electronic components, e.g., executing computer readable and computer executable instructions comprising code contained in a computer usable medium.

It will be appreciated to those skilled in the art having the benefit of this disclosure that this invention is believed to provide a controllable, more accurate, and consistent slew rate output from a driver circuit. The driver circuit is preferably a differential line driver, and more preferably a USB driver. Further modifications and alternative embodiments of various aspects of the invention will be apparent to those skilled in the art in view of this description. It is intended that the following claims be interpreted to embrace all such modifications and changes and, accordingly, the specification and drawings are to be regarded in an illustrative rather than a restrictive sense.

What is claimed is:

1. A driver circuit comprising:
a first delay stage, wherein said first delay stage comprises a first delay circuit comprising a first set of flip-flop circuits coupled in series to produce a first delay signal when a last of a corresponding set of clocking signal transitions occur; and
a second delay stage, wherein said second delay stage comprises a second delay circuit comprising a second set of flip-flop circuits coupled in series to produce a second delay signal when the last of the corresponding set of clocking signal transitions occur; and
wherein said first delay signal and second delay signal are used to generate a first delay output and a second delay output that are sequentially applied to an output port of the driver circuit to form an output slew rate from the driver circuit proportional to a quantity of flip-flop circuits in at least one of the first set of flip-flop circuits or the second set of flip-flop circuits.

2. The driver circuit as recited in claim 1, wherein a clocking signal is derived from a clocking signal implemented in a USB driver to transition data output from a USB driver at a rate of 480 Mb/s.

3. The driver circuit as recited in claim 1, where a clocking signal transitions at 480 MHz.

4. The driver circuit as recited in claim 1, wherein the first delay output is applied prior to the second delay output delayed relative to the first delay output.

5. The driver circuit as recited in claim 4, wherein an amount of said delay is proportional to a number of said second set of flip-flop circuits in said second delay circuit.

6. The driver circuit as recited in claim 1, wherein each of the first set of flip-flop circuits comprises a D-type flip flop for converting an input to each D-type flip-flop into the first delay signal during a transition of a clocking signal.

7. The driver circuit as recited in claim 1, wherein the output port comprises a pair of nodes for sequentially receiving the first delay output and the second delay output.

8. The driver circuit as recited in claim 1, wherein the first delay output and the second delay output are sequentially applied to form an output slew rate from the driver circuit that is proportional to a quantity of the first set of flip-flop circuits.

9. A driver comprising:
   a first delay circuit and a second delay circuit coupled to receive incoming data, wherein said first delay circuit produces a first data control delay signal from an output of the first delay circuit after a first corresponding set of clocking signal transitions has occurred, and wherein said second delay circuit produces a second data control delay signal from an output of the second delay circuit after a second corresponding set of clocking signal transitions has occurred; and
   an output port coupled to sequentially combine each of said first and second data control delay signals upon a conductor to form a driver circuit output signal having a slew rate proportional to a number of clocking signal transitions in said first corresponding set of clocking signal transitions and said second corresponding set of clocking signal transitions, wherein the first and second delay circuits comprise a series-connected plurality of D-type flip flop circuits clocked by the first and second corresponding sets of clocking transitions.

10. The driver circuit as recited in claim 9, wherein the first and second delay circuits are implemented in a USB driver to transition data output from the USB driver at a rate of 480 Mb/s.

11. The driver circuit as recited in claim 9, wherein an individual clocking signal associated with one of the first and second sets of clocking sets transitions at a rate of 480 MHz.

12. The driver circuit as recited in claim 9, wherein the first and second delay circuits induce at least eighty percent of a total delay from when the incoming data is received and the driver circuit output signal is produced.

13. The driver circuit as recited in claim 9, wherein the slew rate increases if the number of clocking signal transitions increases.

14. The driver circuit as recited in claim 9, wherein the slew rate decreases if the number of said set clocking signal transitions decreases.

15. A method for controlling a slew rate output from a driver circuit comprising:
   producing a first outgoing signal delayed from an incoming signal at an output of a first stage within a plurality of stages;
   producing a second outgoing signal delayed from an incoming signal at an output of a second stage within the plurality of stages;
   combining the first outgoing signal and second outgoing signal upon a conductor; and
   varying a delay of the first and second outgoing signals relative to the incoming signals to vary the slew rate output from the driver circuit, wherein said varying the delay comprises providing a number of flip flop circuits coupled in series with one another, wherein the slew rate is proportional to a set of clocking signal transitions.

16. The method as recited in claim 15, wherein said combining comprises placing the first and second output signals as differential signals upon a corresponding pair of conductors.

17. The method as recited in claim 15, wherein said producing comprises outputting the first or second outgoing signal from the first or second stage upon the last of a set of clocking signal transitions.

18. The method as recited in claim 15, wherein said combining comprises sequentially placing the first and second output signals upon the conductor spaced in time corresponding to a time between a first clocking signal transition of a set of clocking signal transitions and a last clocking signal transition of the set of clocking signal transitions.

* * * * *